US012456308B2

(12) United States Patent
Nakashima et al.

(10) Patent No.: US 12,456,308 B2
(45) Date of Patent: Oct. 28, 2025

(54) MOVING BODY CONTROL DEVICE, MOVING BODY CONTROL METHOD, AND MOVING BODY CONTROL PROGRAM

(71) Applicants: HONDA MOTOR CO., LTD., Tokyo (JP); AISIN CORPORATION, Aichi (JP)

(72) Inventors: Hiroyuki Nakashima, Tokyo (JP); Takeshi Sasajima, Tokyo (JP); Hiroki Takaku, Tokyo (JP); Hideki Nagatomo, Tokyo (JP); Tatsuro Fujiwara, Tokyo (JP); Makoto Bessho, Tokyo (JP); Masaya Kato, Kariya (JP); Jun Adachi, Kariya (JP); Momoka Akaike, Aichi (JP); Kazutaka Hayakawa, Kariya (JP)

(73) Assignees: HONDA MOTOR CO., LTD., Tokyo (JP); AISIN CORPORATION, Kariya (JP)

( * ) Notice: Subject to any disclaimer, the term of this patent is extended or adjusted under 35 U.S.C. 154(b) by 94 days.

(21) Appl. No.: 18/491,868

(22) Filed: Oct. 23, 2023

(65) Prior Publication Data

US 2024/0144700 A1 May 2, 2024

(30) Foreign Application Priority Data

Oct. 28, 2022 (JP) ................................ 2022-172985

(51) Int. Cl.
*G06V 20/58* (2022.01)
*B60W 30/06* (2006.01)
*G06V 10/60* (2022.01)

(52) U.S. Cl.
CPC ........... *G06V 20/586* (2022.01); *B60W 30/06* (2013.01); *G06V 10/60* (2022.01); *B60W 2420/403* (2013.01)

(58) Field of Classification Search
CPC ...... G06V 20/586; G06V 10/60; G06V 10/44; G06V 20/56; B60W 30/06;
(Continued)

(56) References Cited

U.S. PATENT DOCUMENTS

2009/0207045 A1 8/2009 Jung
2019/0220997 A1 7/2019 Asai et al.
(Continued)

FOREIGN PATENT DOCUMENTS

CN 111508260 A 8/2020
JP 2010-30597 A 2/2010
(Continued)

OTHER PUBLICATIONS

European Office Action dated Dec. 2, 2024 issued in corresponding European application No. 23205257.1; English text (8 pages).
(Continued)

*Primary Examiner* — Daryl C Pope
(74) *Attorney, Agent, or Firm* — Rankin, Hill & Clark LLP

(57) ABSTRACT

A moving body control device includes an outside recognition unit configured to acquire recognition data of an outside of a moving body, a reception unit which receives designation of a predetermined parking position from a user of the moving body, and a control unit configured to perform automatic parking control for parking the moving body at the predetermined parking position based on the recognition data of the outside and the predetermined parking position, and register the predetermined parking position as a designated parking position. The control unit is configured to register feature points related to the designated parking position by using a plurality of patterns based on illuminance of the outside calculated from the recognition data of the outside.

5 Claims, 7 Drawing Sheets

(58) Field of Classification Search
CPC ........... B60W 2420/403; B60W 50/00; B60W 2050/0095; B60W 2420/54; B60W 2554/20; B62D 15/0285
See application file for complete search history.

(56) References Cited

U.S. PATENT DOCUMENTS

| | | | | |
|---|---|---|---|---|
| 2019/0367012 | A1 | 12/2019 | Matta et al. | |
| 2020/0242936 | A1 | 7/2020 | Matsunaga et al. | |
| 2021/0162985 | A1 | 6/2021 | Romero Leon et al. | |
| 2021/0394782 | A1 | 12/2021 | Tagawa et al. | |
| 2022/0221867 | A1 * | 7/2022 | Taveira .................. | G05D 1/617 |
| 2022/0299322 | A1 | 9/2022 | Ikeda | |

FOREIGN PATENT DOCUMENTS

| | | | |
|---|---|---|---|
| JP | 2019-132664 | A | 8/2019 |
| JP | 2020-34366 | A | 3/2020 |
| JP | 2020-117128 | A | 8/2020 |
| JP | 2021197002 | A | * 12/2021 |
| JP | 2022-142826 | A | 10/2022 |

OTHER PUBLICATIONS

English machine translation of Japanese Office Action dated Apr. 1, 2025 issued in corresponding Japanese application No. 2022-172985 (3 pages).

* cited by examiner

81

| SLOT | MAP (MAP OF FEATURE POINTS AND PARKING POSITION) |
|---|---|
| DAYTIME | MAP a |
| NIGHTTIME | MAP b |

MOVING BODY CONTROL DEVICE, MOVING BODY CONTROL METHOD, AND MOVING BODY CONTROL PROGRAM

CROSS-REFERENCE TO RELATED APPLICATIONS

This application is based on and claims priority under 35 USC 119 from Japanese Patent Application No. 2022-172985 filed on Oct. 28, 2022.

TECHNICAL FIELD

The present disclosure relates to a moving body control device, a moving body control method, and a moving body control program.

BACKGROUND ART

In recent years, efforts to provide access to sustainable transport systems which consider vulnerable people among transport participants are increasing. To achieve such system, research and development to further improve traffic safety and convenience is focused through research and development on autonomous driving technology.

In the related art, automatic parking control which automatically moves a vehicle to a predetermined parking space which is designated and parks the vehicle has been known. In JP 2020-117128 A, a parking support device is described in which a user performs manual driving and parking of manually driving and parking a vehicle in a predetermined parking space, feature point information related to the surroundings of the vehicle is acquired and stored in a memory during the manual driving and parking, and automatic parking control is performed based on the feature point information.

However, even when a vehicle is parked in the same parking space, there may be a difference in the feature point information related to the surroundings of the vehicle to be acquired, due to a difference in the environment around the vehicle, for example. Therefore, if there is a mismatch between the feature point information stored in the memory and the feature point information when the next automatic parking is executed, the target parking space may not be recognized and the automatic parking control may not be possible. However, JP 2020-117128 A does not describe control of the vehicle when there is a difference in feature point information related to the surroundings of the vehicle to be acquired due to a difference in the environment. Therefore, improvement is needed in the related art.

SUMMARY OF INVENTION

An object of the present disclosure is to provide a moving body control device, a moving body control method, and a moving body control program capable of automatically parking a moving body at a designated parking position with high accuracy even when the environment of an outside the moving body changes. The present disclosure eventually contributes to the development of sustainable transportation systems.

According to an aspect of the present disclosure, there is provided a moving body control device including an outside recognition unit configured to acquire recognition data of an outside of a moving body, a reception unit which receives designation of a predetermined parking position from a user of the moving body, and a control unit configured to perform automatic parking control for parking the moving body at the predetermined parking position based on the recognition data of the outside and the predetermined parking position, and register the predetermined parking position as a designated parking position, in which the control unit is configured to register feature points related to the designated parking position by using a plurality of patterns based on illuminance of the outside calculated from the recognition data of the outside.

According to another aspect of the present disclosure, there is provided a moving body control method including a processor of a moving body control device, in which the processor of the moving body control device is configured to acquire recognition data of an outside of a moving body, receive designation of a predetermined parking position from a user of the moving body, perform automatic parking control for parking the moving body at the predetermined parking position based on the recognition data of the outside and the predetermined parking position, and register the predetermined parking position as a designated parking position, and register feature points related to the designated parking position by using a plurality of patterns based on illuminance of the outside calculated from the recognition data of the outside.

According to another aspect of the present disclosure, there is provided a moving body control program causing a processor of a moving body control device to execute a process of acquiring recognition data on an outside of a moving body, receiving designation of a predetermined parking position from a user of the moving body, performing automatic parking control for parking the moving body at the predetermined parking position based on the recognition data of the outside and the predetermined parking position, and registering the predetermined parking position as a designated parking position, and registering feature points related to the designated parking position by using a plurality of patterns based on illuminance of the outside calculated from the recognition data of the outside.

According to the moving body control device, the moving body control method, and the moving body control program of the present disclosure, it is possible to automatically park a moving body at a designated parking position with high accuracy even when the environment outside the moving body changes.

DESCRIPTION OF EMBODIMENTS

Figure 1:
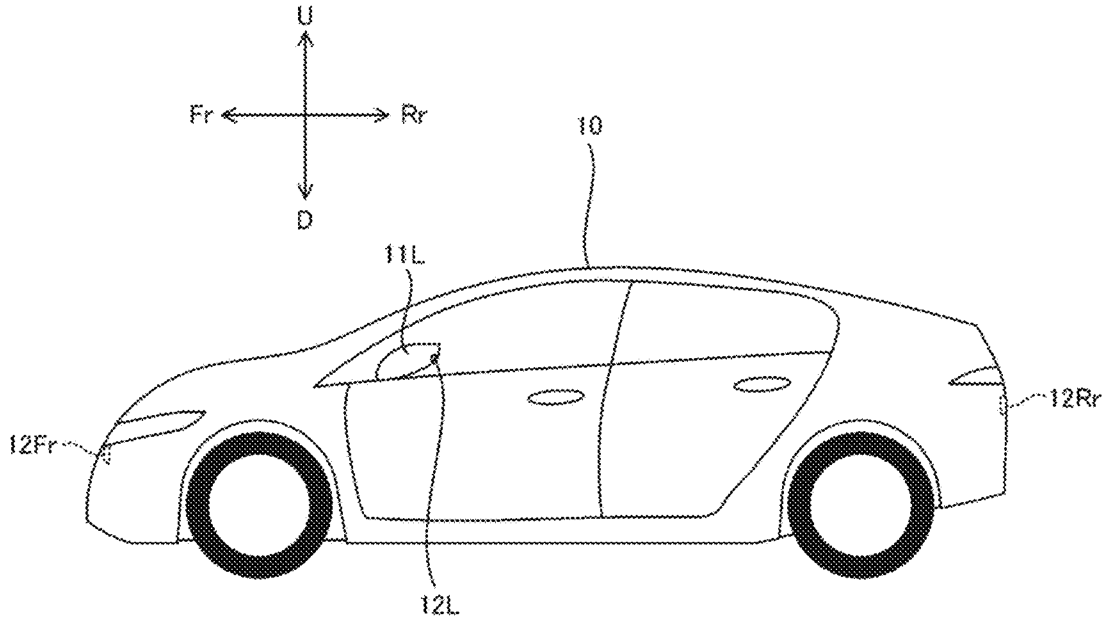
FIG. 1 is a side view illustrating an example of a vehicle equipped with a moving body control device according to the present embodiment.

An embodiment of a moving body control device, a moving body control method, and a moving body control program according to the present disclosure will be described below with reference to the accompanying drawings. The drawings are to be viewed in the direction of the reference numerals. In the specification and the like, for the sake of simplicity and clarity of explanation, front and rear, left and right, and up and down directions are described according to the directions seen from the driver of a vehicle 10 illustrated in FIGS. 1 and 2. In the drawings, Fr denotes the front of the vehicle 10, Rr denotes the rear, L denotes the left, R denotes the right, U denotes the top, and D denotes the bottom.

<Vehicle 10 Equipped with Moving Body Control Device according to Present Disclosure>

Figure 2:
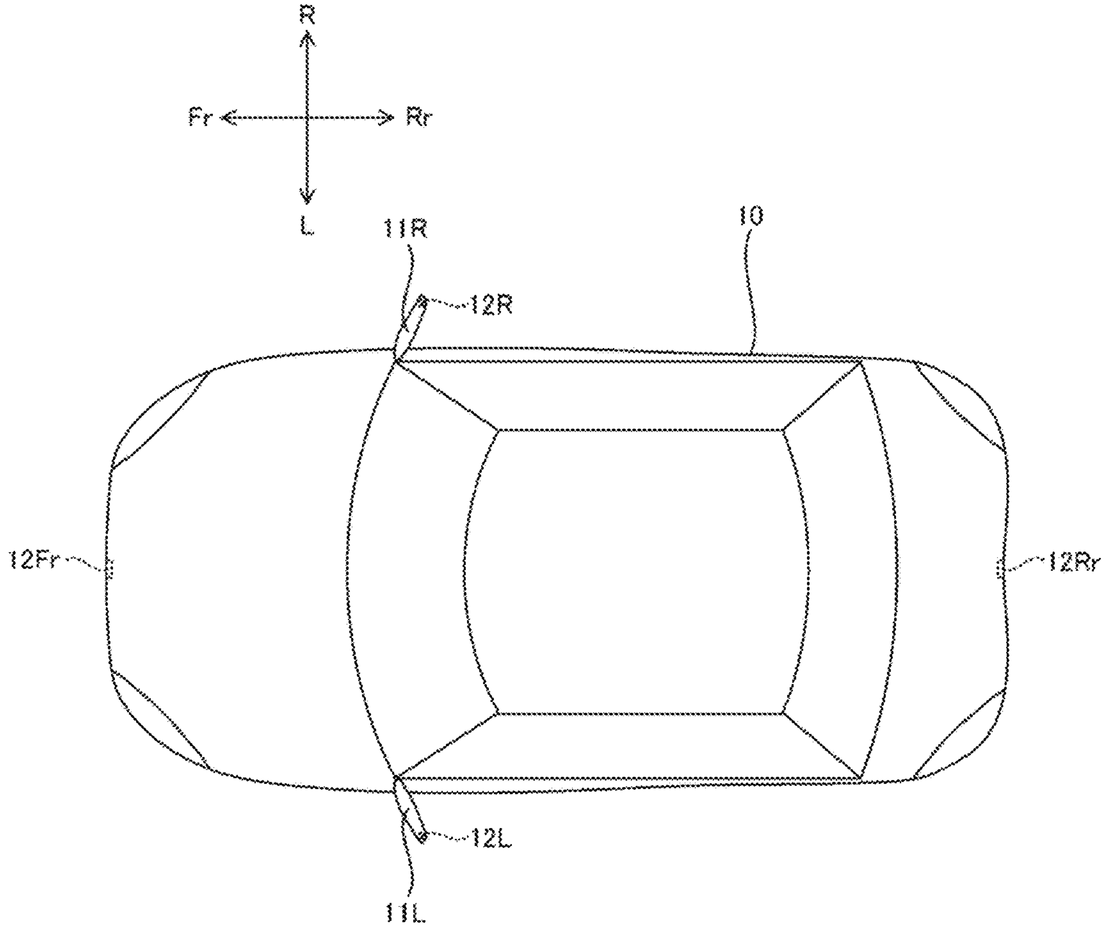
FIG. 2 is a top view of the vehicle illustrated in FIG. 1.

FIG. 1 is a side view of a vehicle 10 equipped with the moving body control device according to the present disclosure. FIG. 2 is a top view of the vehicle 10 illustrated in FIG. 1. The vehicle 10 is an example of a moving body according to the present disclosure.

The vehicle 10 is an automobile which includes a driving source (not illustrated) and wheels including a driving wheel driven by power of the driving source and a steerable steering wheel. In the present embodiment, the vehicle 10 is a four-wheel automobile which includes a pair of left and right front wheels and a pair of left and right rear wheels. The driving source of the vehicle 10 is, for example, an electric motor. The driving source of the vehicle 10 may be an internal combustion engine such as a gasoline engine or a diesel engine, or may be a combination of an electric motor and an internal combustion engine. The driving source of the vehicle 10 may drive the pair of left and right front wheels, may drive the pair of left and right rear wheels, or may drive four wheels of the pair of left and right front wheels and the pair of left and right rear wheels. The front and rear wheels may be both steerable steering wheels or any one thereof may be a steerable steering wheel.

The vehicle 10 further includes side mirrors 11L and 11R. The side mirrors 11L and 11R are mirrors (rearview mirrors) provided in the outside the front doors of the vehicle 10 and used for the driver to check the rear sides and the rear lateral side. The side mirrors 11L and 11R are fixed to the main body of the vehicle 10 by rotating shafts extending in the vertical direction, and can be opened and closed by rotating about the rotating shafts.

The vehicle 10 further includes a front camera 12Fr, a rear camera 12Rr, a left side camera 12L, and a right side camera 12R. The front camera 12Fr is a digital camera which is provided in the front of the vehicle 10 and captures the front side of the vehicle 10. The rear camera 12Rr is a digital camera which is provided in the rear of the vehicle 10 and captures the rear side of the vehicle 10. The left side camera 12L is a digital camera which is provided in the left side mirror 11L of the vehicle 10 and captures the left side of the vehicle 10. The right side camera 12R is a digital camera which is provided in the right side mirror 11R of the vehicle 10 and captures the right side of the vehicle 10. The front camera 12Fr, the rear camera 12Rr, the left side camera 12L, and the right side camera 12R are examples of an outside recognition unit of the present invention.

<Internal Configuration of Vehicle 10>

Figure 3:
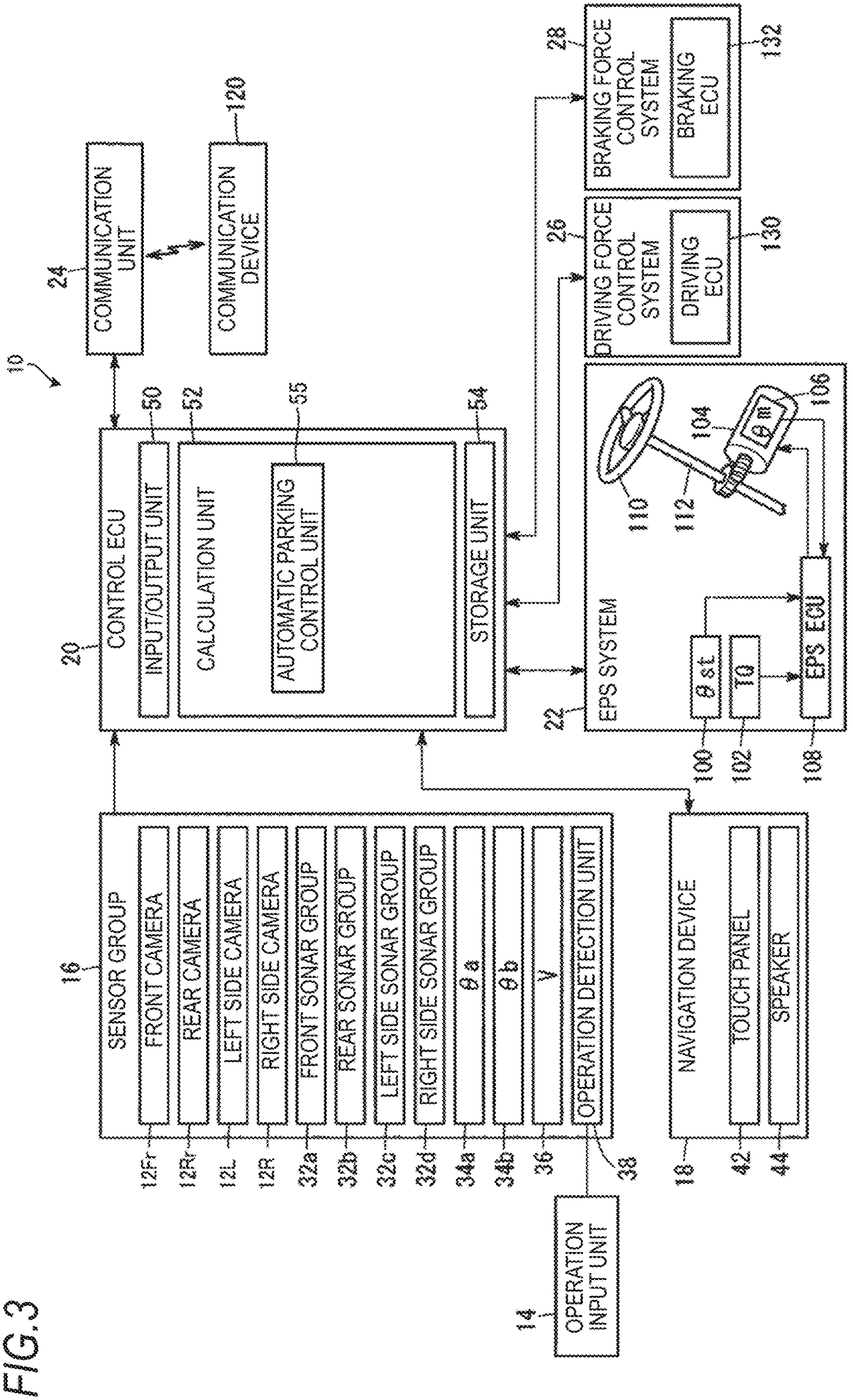
FIG. 3 is a block diagram illustrating the internal configuration of the vehicle illustrated in FIG. 1.

FIG. 3 is a block diagram illustrating an example of the internal configuration of the vehicle 10 illustrated in FIG. 1. As illustrated in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detected values used for control by the control ECU 20. The sensor group 16 includes the front camera 12Fr, the rear camera 12Rr, the left side camera 12L, and the right side camera 12R. The sensor group 16 includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R acquire recognition data (for example, surrounding images) for recognizing the outside of the vehicle 10 by capturing the surroundings of the vehicle 10. The surrounding images captured by the front camera 12Fr, the rear camera 12Rr, the left side camera 12L, and the right side camera 12R are referred to as a front image, a rear image, a left side image, and a right side image, respectively. Images formed by the left side image and the right side image may be also referred to as side images.

The front sonar group 32*a*, the rear sonar group 32*b*, the left side sonar group 32*c*, and the right side sonar group 32*d* emit ultrasonic waves to the surroundings of the vehicle 10 and receive waves reflected from other objects. The front sonar group 32*a* includes, for example, four sonars. The sonars included in the front sonar group 32*a* are respectively provided in diagonally left front, left front, right front, and diagonally right front of the vehicle 10. The rear sonar group 32*b* includes, for example, four sonars. The sonars included in the rear sonar group 32*b* are respectively provided in diagonally left rear, left rear, right rear, and diagonally right rear of the vehicle 10. The left side sonar group 32*c* includes, for example, two sonars. The sonars included in the left side sonar group 32*c* are provided in the left side front and left side rear of the vehicle 10. The right side sonar group 32*d* includes, for example, two sonars. The sonars included in the right side sonar group 32*d* are provided in the right side front and right side rear of the vehicle 10.

The wheel sensors 34*a* and 34*b* detect rotation angles of the wheels of vehicle 10. The wheel sensors 34*a* and 34*b* may be configured with angle sensors or may be configured with displacement sensors. The wheel sensors 34*a* and 34*b* output detection pulses whenever the wheels are rotated by a predetermined angle. The detection pulses output from the wheel sensors 34*a* and 34*b* are used to calculate a rotation angle of the wheels and a rotation speed of the wheels. Based on the rotation angles of the wheels, a movement distance of the vehicle is calculated. The wheel sensor 34*a* detects, for example, a rotation angle $\theta a$ of the left rear wheel. The wheel sensor 34*b* detects, for example, a rotation angle $\theta b$ of the right rear wheel.

The vehicle speed sensor 36 detects a speed of the vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects operation content performed by a user using an operation input unit 14 and outputs the detected operation content to the control ECU 20. The operation input unit 14 includes, for example, various user interfaces such as a side mirror switch switching between opening and closing states of the side mirrors 11L and 11R, and a shift lever (a select lever or a selector).

The navigation device 18 detects a current position of the vehicle 10 using, for example, a global positioning system (GPS), and guides the user along a route to a destination. The navigation device 18 includes a storage device (not illustrated) including map information database.

The navigation device 18 includes a touch panel 42 and a speaker 44. The touch panel 42 functions as an input device and a display device for the control ECU 20. The speaker 44 outputs various types of guide information by a sound to a passenger of the vehicle 10.

The touch panel 42 is configured such that various instructions can be input to the control ECU 20. For example, the user can input an instruction related to parking support of the vehicle 10 via the touch panel 42. The touch panel 42 is configured to display various screens related to the control contents of the control ECU 20. For example, a screen related to the parking support of the vehicle 10 is displayed on the touch panel 42. Specifically, a parking support button for requesting parking support of the vehicle 10 is displayed on the touch panel 42. The parking support button includes an automatic parking button for requesting parking by automatic steering of the control ECU 20 and a parking assistance button for requesting assistance when the driver performs manual parking. Components other than the touch panel 42, such as a smart phone, may be used as an input device or a display device. The touch panel 42 (navigation device 18) and the smart phone are examples of a reception unit of the present invention.

For example, "parking" is a stop which accompanies getting on and off of occupants, and excludes a temporary stop due to a traffic signal or the like. "Parking position" is a position at which the moving body is stopped, that is, parked.

The control ECU 20 includes an input/output unit 50, a calculation unit 52 and a storage unit 54. The calculation unit 52 is configured by, for example, a central processing unit (CPU). The calculation unit 52 performs various controls by controlling each unit based on the programs stored in the storage unit 54. The calculation unit 52 inputs and outputs signals to and from each unit connected to the control ECU 20 via the input/output unit 50.

The calculation unit 52 includes an automatic parking control unit 55 for controlling automatic parking of the vehicle 10. The automatic parking control unit 55 is an example of a control unit of the present invention. The automatic parking control unit 55 assists the parking of the vehicle 10 by automatic steering which automatically operates a steering wheel 110 under the control of the automatic parking control unit 55. In assisting the automatic steering, an accelerator pedal (not illustrated), a brake pedal (not illustrated) and the operation input unit 14 are automatically operated. The automatic parking control unit 55 performs assistant parking support when the driver performs the operations on the accelerator pedal, the brake pedal, and the operation input unit 14 and manually parks the vehicle 10.

For example, the automatic parking control unit 55 performs automatic parking control for parking the vehicle 10 at a designated predetermined parking position based on the recognition data of the outside of the vehicle 10 acquired by the front camera 12Fr, the rear camera 12Rr, the left side camera 12L, and the right side camera 12R, and the predetermined parking position designated by the user.

The automatic parking control unit 55 registers the predetermined parking position designated by the user in the storage unit 54 as the designated parking position. The automatic parking control unit 55 calculates illuminance of the outside from the recognition data of the outside of the vehicle 10, and generates, for example, a plurality of slots (time zones) according to the calculated illuminance of the outside. The automatic parking control unit 55 registers a designated parking position to be registered in association with feature points related to the designated parking position for each slot.

The illuminance calculated from the recognition data of the outside is the actual illuminance of the environment of the outside, and is not the illuminance of the image which changes depending on the exposure setting or the like. The illuminance is brightness of an environment which varies depending on, for example, time zone (daytime, nighttime, or the like) and weather (clear weather, cloudy weather, or the like). The recognition data of the outside for calculating the illuminance is the surrounding images related to the surroundings of the vehicle 10 captured by the front camera 12Fr, the rear camera 12Rr, the left side camera 12L, and the right side camera 12R. However, the value detected by an illuminance sensor may be used as the illuminance. The illuminance is not limited to numerical values in a specific unit system such as lux (Lx). The feature points related to the designated parking position include feature points of the designated parking position itself, feature points of the surroundings of the designated parking position, and the like. Examples of the feature points of the designated parking position itself include a feature point such as a character "parking" displayed within the designated parking position. Examples of the feature points of the surroundings of the designated parking position include characteristic buildings and obstacles existing in the surroundings.

The automatic parking control unit 55 acquires the illuminance of the outside from the recognition data of the outside when executing the automatic parking control to the designated parking position designated by the user, and selects a map including feature points related to the designated parking position registered in association with the slot corresponding to the illuminance, from the registration data in the storage unit 54. The slot corresponding to the illuminance is a slot with an illuminance which matches or is close to the illuminance acquired during execution.

The automatic parking control unit 55 selects a specific slot pattern composed of slots for which the map is registered, and determines whether self-position recognition by the vehicle 10 is possible based on the slot pattern. The self-position recognition refers to recognizing a relative position of the vehicle 10 with respect to the designated parking position by comparing a current camera image with a map containing feature points related to the registered designated parking position. When self-position recognition by the vehicle 10 is possible, the automatic parking control unit 55 performs automatic parking control to the designated parking position based on the selected specific slot pattern. When self-position recognition by the vehicle 10 is not possible, the automatic parking control unit 55 does not perform automatic parking control to the designated parking position based on the selected specific slot pattern.

When a map containing feature points related to the designated parking position is not registered in the slot corresponding to the illuminance of the outside and there is no specific slot pattern, the automatic parking control unit 55 determines whether self-position recognition by the vehicle 10 is possible based on any slot pattern among other slot patterns with which the map is registered. The automatic parking control unit 55 performs automatic parking control to the designated parking position based on the slot pattern when self-position recognition is possible, and does not perform the automatic parking control to the designated parking position when self-position recognition is not possible.

When the automatic parking control unit 55 cannot recognize the self-position of the vehicle 10 based on any of the registered slot patterns, the automatic parking control unit 55 receives manual setting of a predetermined parking position from the user of the vehicle 10, and generates and registers a new slot pattern with which a map is registered.

The EPS system 22 includes a steering angle sensor 100, a torque sensor 102, an EPS motor 104, a resolver 106, and an EPS ECU 108. The steering angle sensor 100 detects a steering angle Est of the steering wheel 110. The torque sensor 102 detects torque TQ applied to the steering wheel 110.

The EPS motor 104 applies driving force or reaction force to a steering column 112 connected to the steering wheel 110, thereby enabling the operation support of the steering wheel 110 by the occupants and the automatic steering at the time of parking support. The resolver 106 detects the rotation angle θm of the EPS motor 104. The EPS ECU 108 controls the entire EPS system 22. The EPS ECU 108 is provided with an input/output unit (not illustrated), a calculation unit (not illustrated), and a storage unit (not illustrated).

The communication unit 24 enables wireless communication with another communication device 120. The other communication device 120 is a base station, a communication device of another vehicle, an information terminal such as a smart phone possessed by a passenger of the vehicle 10, or the like.

The driving force control system 26 includes a driving ECU 130. The driving force control system 26 performs driving force control of the vehicle 10. The driving ECU 130 controls a driving force of the vehicle 10 by controlling an engine (not illustrated) and the like, based on an operation on an accelerator pedal (not illustrated) by the user.

The braking force control system 28 includes a braking ECU 132. The braking force control system 28 performs braking force control of the vehicle 10. The braking ECU 132 controls a braking force of the vehicle 10 by controlling a brake mechanism (not illustrated) or the like, based on an operation on the brake pedal (not illustrated) by the user.

<Automatic Parking Control by Automatic Parking Control Unit 55>

Next, automatic parking control of the vehicle 10 by the automatic parking control unit 55 will be described with reference to FIGS. 4 to 10.

Figure 4:
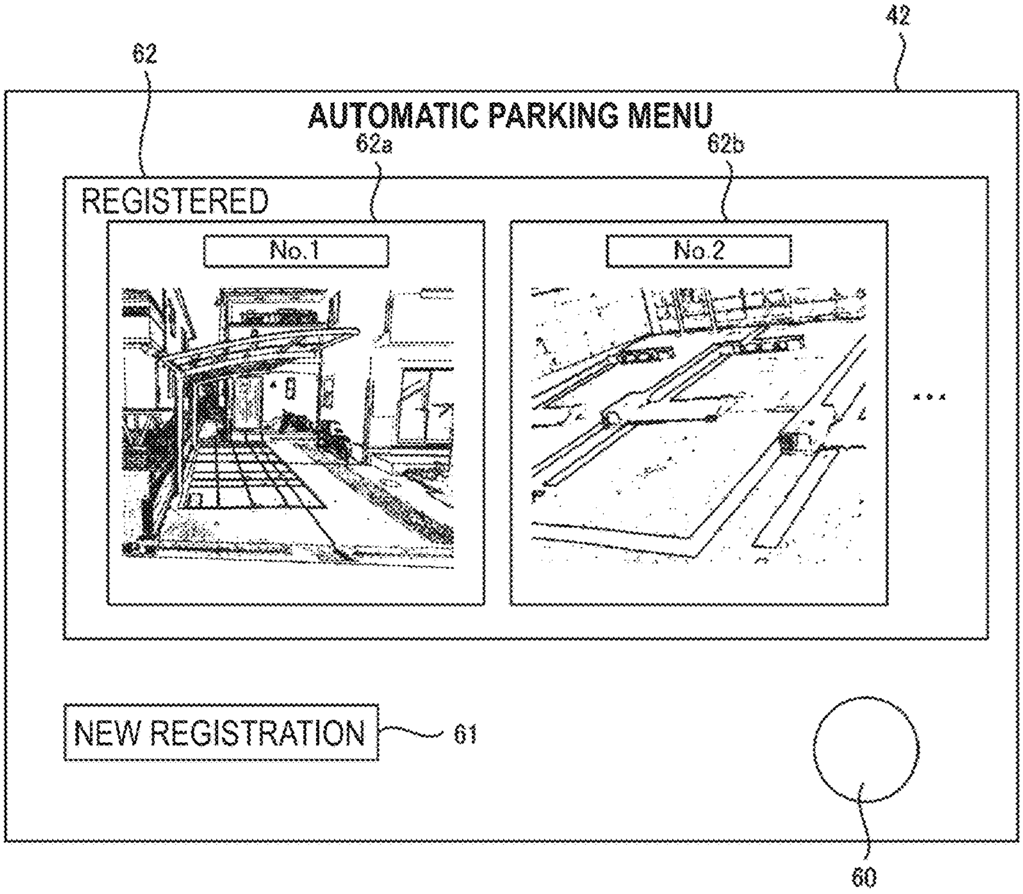
FIG. 4 is a diagram illustrating an example of an image displayed on a navigation device when the vehicle is automatically parked.

FIG. 4 is a diagram illustrating an example of an "automatic parking menu" displayed on the touch panel 42 of the navigation device 18 when the vehicle 10 is automatically parked. The image of the automatic parking menu is displayed by touch-operating an automatic parking button 60 displayed on the touch panel 42. For example, when the user who wants to park the vehicle 10 comes near the parking lot, the user performs a touch operation for the automatic parking button 60 to display the automatic parking menu.

As illustrated in FIG. 4, a new registration button 61 and a registered parking position image button 62 are displayed on the image of the automatic parking menu. The new registration button 61 is a button to be operated when the vehicle 10 is to be parked at a parking position to be newly registered as a designated parking position. The registered parking position image button 62 is a button to be operated when the vehicle 10 is to be parked at a designated parking position which is already registered. Examples of the registered parking position image button 62 include a parking position image button in which a parking lot at home is registered as the designated parking position as illustrated in the No. 1-image button 62*a*, a parking position image button in which a coin parking lot with a high parking frequency is registered as the designated parking position as illustrated in the No. 2-image button 62*b*, or the like. The image displayed on the registered parking position image button 62 is an image captured by, for example, the front camera 12Fr of the vehicle 10 at the time of registration.

[Automatic Parking Control to New Parking Position]

First, the automatic parking control by the automatic parking control unit 55 when the new registration button 61 is operated by touch will be described with reference to FIGS. 5 to 9.

Figure 5:
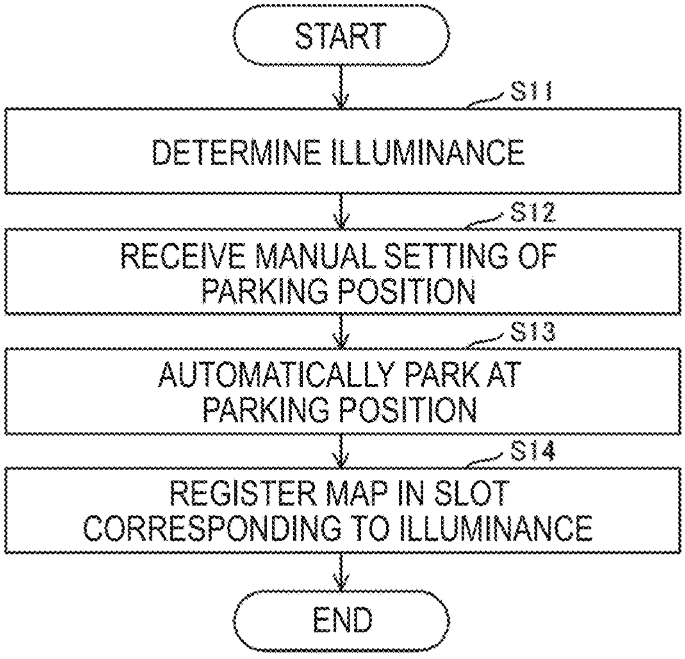
FIG. 5 is a flow chart illustrating automatic parking control for parking the vehicle in a new parking position.
Figure 6:
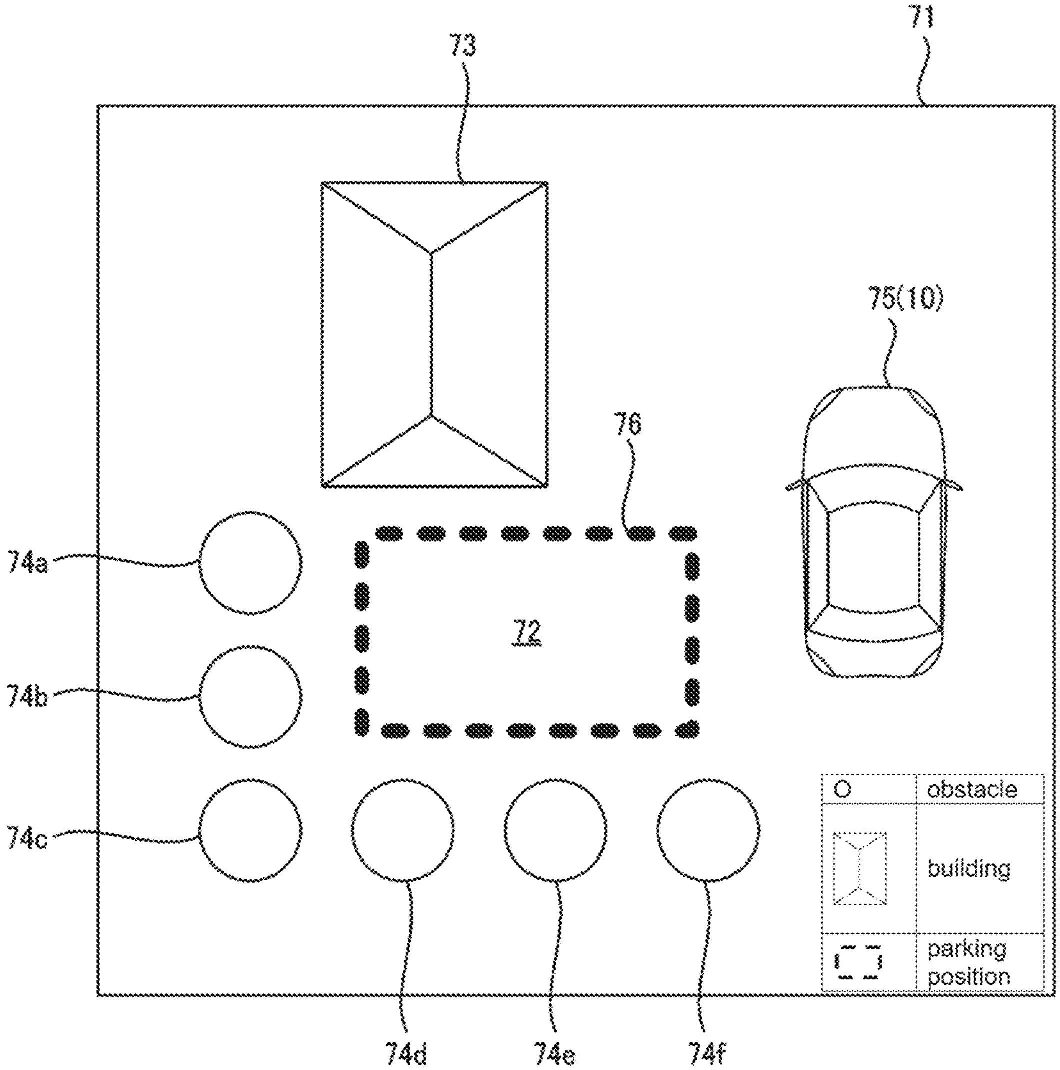
FIG. 6 is a diagram in which a parking position is set in a bird's-eye view image generated based on an image captured by a camera.
Figures 7, 8:
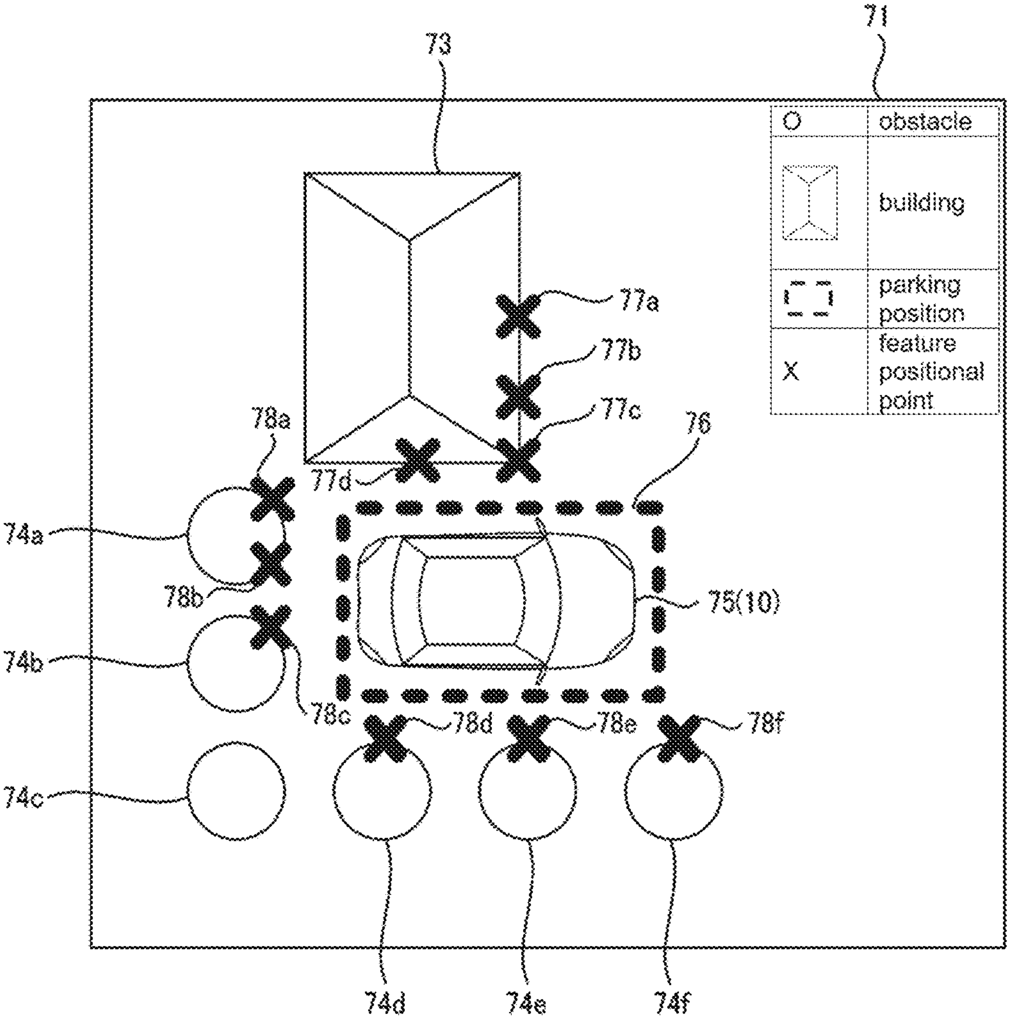
FIG. 7 is a diagram illustrating feature points of the surroundings of the parking position illustrated in FIG. 6.
FIG. 8 is a diagram illustrating an example of registration contents registered for the parking position.
Figure 9:
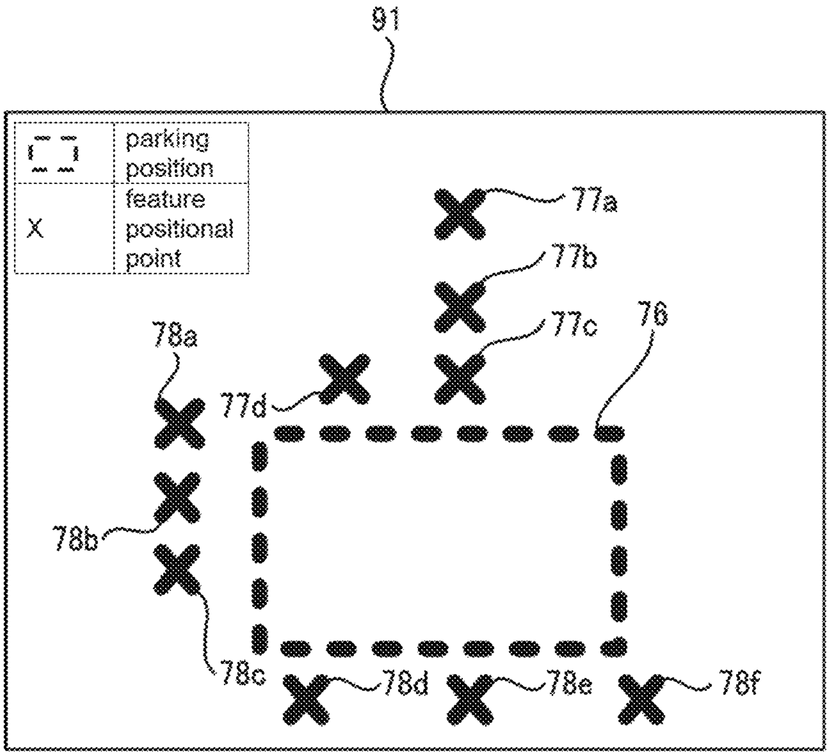
FIG. 9 is a diagram illustrating an example of a map included in the registration contents of FIG. 8.

FIG. 5 is a flow chart illustrating automatic parking control for parking the vehicle in a new parking position. FIG. 6 is a diagram in which a parking position 76 is set in a bird's-eye view image 71 (composite image) generated from the recognition data of the outside of the vehicle 10 acquired by the front camera 12Fr, the rear camera 12Rr, the left side camera 12L, and the right side camera 12R. FIG. 7 is a diagram illustrating feature points of the surroundings of the parking position 76 illustrated in FIG. 6. FIG. 8 is a diagram illustrating an example of registration contents registered for the parking position. FIG. 9 is a diagram illustrating an example of a map included in the registration contents of FIG. 8. When the new registration button 61 is operated by touch, the automatic parking control unit 55 starts a process illustrated in FIG. 5.

First, the automatic parking control unit 55 calculates the illuminance of the outside from the recognition data of the outside of the vehicle 10 acquired by the front camera 12Fr, the rear camera 12Rr, the left side camera 12L, and the right side camera 12R, and determines which of a plurality of preset slots corresponds to the calculated illuminance (step S11). The plurality of slots are set according to the level of brightness of the surrounding environment, for example, "daytime" with high illuminance and "nighttime" with low illuminance.

For example, the vehicle 10 is parked in front of a parking lot 72 at home, as in the bird's-eye view image 71 illustrated in FIG. 6. When the new registration button 61 is touched to register a new designated parking position, recognition data of the outside is acquired by the front camera 12Fr, the rear camera 12Rr, the left side camera 12L, and the right side camera 12R, and the illuminance of the outside is calculated. In the bird's-eye view image 71, a driver's residence (building) 73 and a plurality of plants (obstacles) 74*a* to 74*f* are captured. The parking lot 72 is designated between the building 73 and the obstacles 74*a* to 74*f* The vehicle displayed in the bird's-eye view image 71 is an image illustrating the state of the vehicle 10 viewed from above, and is a vehicle image 75 which is generated (captured) in advance and stored in the storage unit 54 or the like.

Next, the automatic parking control unit 55 receives manual setting by the driver for setting the parking position of the vehicle 10 (step S12).

As illustrated in FIG. 6, the parking position is manually set by operating a rectangular parking position 76 indicating the area where the vehicle 10 is to be parked on the touch panel 42 by touch and sliding the vehicle 10 to the desired parking position.

When the manual setting of the parking position 76 is received in step S12, the automatic parking control unit 55 detects feature points related to the designated parking position 76, from the recognition data of the outside acquired by the front camera 12Fr, the rear camera 12Rr, the left side camera 12L, and the right side camera 12R, and automatically parks the vehicle 10 at the parking position 76 based on the detected feature points (step S13).

For example, as in the bird's-eye view image 71 illustrated in FIG. 7, the automatic parking control unit 55 detects building feature points 77*a* to 77*d* indicating the positions of the outline of the building 73 on the side closer to the parking position 76, obstacle feature points 78*a* to 78*f* indicating positions of the obstacles 74*a* to 74*f* existing around the parking position 76, or the like, as feature points related to the designated parking position 76.

Next, the automatic parking control unit 55 registers a map configured by feature points related to the designated parking position 76 detected in step S13 and the parking position 76 set in step S12 in association with a slot corresponding to the illuminance calculated in step S11, in the storage unit 54 (step S14).

As illustrated in a correspondence table 81 of FIG. 8, for example, the contents registered for the designated parking position 76 are classified into several patterns such as "daytime" with high illuminance and "nighttime" with low illuminance as slots corresponding to illuminance. Corresponding to the "daytime" and "nighttime" slots, maps of the parking position 76 and feature points related to the parking position 76 are registered as, for example, "map a" and "map b".

Specifically, such as a map 91 illustrated in FIG. 9, the map of the parking position 76 and the feature points related to the parking position 76 is registered as a map illustrating the relationship between the building feature points 77*a* to 77*d* and the obstacle feature points 78*a* to 78*f* detected in the bird's-eye view image 71 of FIG. 7 and the manually set parking position 76. In the correspondence table 81 of FIG. 8, for convenience of explanation, "map a" corresponding to "daytime" and "map b" corresponding to "nighttime" are registered, but the example is a process performed when the new registration button 61 is touch-operated, so the map actually registered in step S14 is only the map of the slot corresponding to the illuminance at the time of registration.

Thus, the parking position 76 designated by the user is registered in the storage unit 54 as a designated parking position having feature points corresponding to the illuminance of the outside, and is displayed in the automatic parking menu as one of the registered parking position image buttons 62.

[Automatic Parking Control to Registered Parking Position]

Next, automatic parking control by the automatic parking control unit 55 when the registered parking position image button 62 is touch-operated will be described with reference to FIG. 10.

Figure 10:
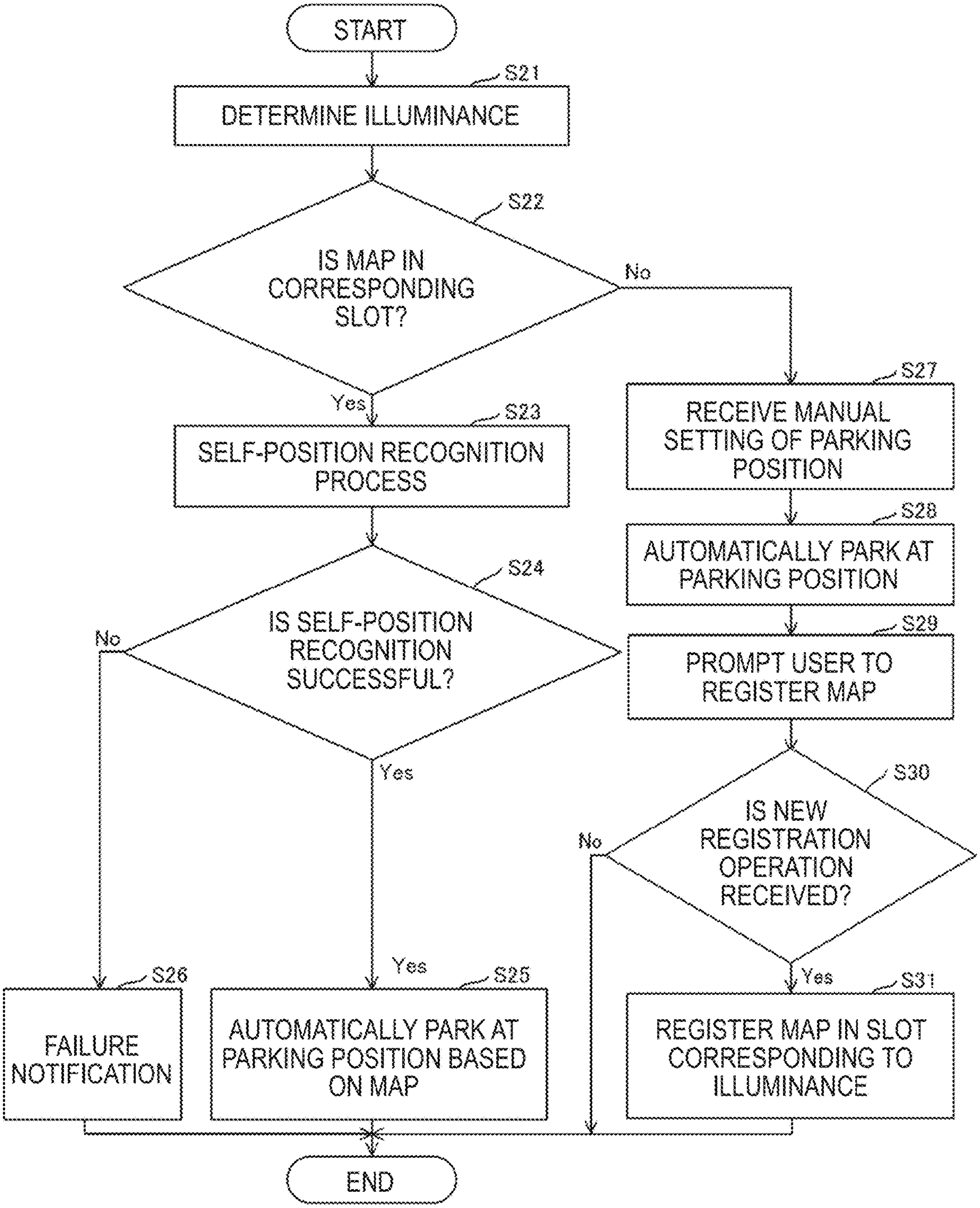
FIG. 10 is a flow chart illustrating an example of automatic parking control for parking the vehicle at a registered parking position.

FIG. 10 is a flow chart illustrating an example of automatic parking control for parking the vehicle 10 at a registered parking position. When the registered parking position image button 62 of the automatic parking menu illustrated in FIG. 4 is touch-operated, the automatic parking control unit 55 starts the processing illustrated in FIG. 10. In the present example, it is assumed that No. 1-image button 62*a* was touch-operated by the driver of the vehicle 10.

The automatic parking control unit 55 determines the illuminance of the outside from the recognition data on the outside of the vehicle 10 acquired by the front camera 12Fr, the rear camera 12Rr, the left side camera 12L, and the right side camera 12R (step S21). The determination process is the same process as step S11 in FIG. 5 described above.

Next, the automatic parking control unit 55 determines whether a map is registered in the slot corresponding to the illuminance of the outside determined in step S21 for the designated parking position of the No. 1-image button 62*a* (step S22).

When a map is registered in the corresponding slot in step S22 (step S22: Yes), the automatic parking control unit 55 performs a self-position recognition process for recognizing the relative position of the vehicle 10 with respect to the designated parking position, based on the slot pattern in which the map is registered and the current camera image (step S23).

Next, the automatic parking control unit 55 determines whether the self-position can be recognized in the self-position recognition process of step S23 (step S24).

When the self-position can be recognized in step S24 (step S24: Yes), the automatic parking control unit 55 automatically parks the vehicle 10 at the designated parking position of the No. 1-image button 62*a* designated by the driver of the vehicle 10, based on the slot pattern in which the map is registered (step S25).

When the self-position cannot be recognized in step S24 (step S24: No), the automatic parking control unit 55 notifies the driver that the vehicle 10 cannot be recognized with the currently registered data, for example, through the touch panel 42 or the speaker 44 (step S26). That is, even when a map is registered in the corresponding slot, when the self-position cannot be recognized, the automatic parking control unit 55 does not automatically park the vehicle 10 at the designated parking position.

On the other hand, when no map is registered in the corresponding slot in step S22 (step S22: No), the automatic parking control unit 55 receives manual setting by the driver for setting the parking position of the vehicle 10 (step S27). To inform the driver that manual setting of the parking position needs to be received, the automatic parking control unit 55 displays the bird's-eye view image similar to FIG. 6, and displays, for example, the message "Data is insufficient for automatic parking. Please make settings." on the touch panel 42. The method of manually setting the parking position is the same as step S12 in FIG. 5 described above.

When the manual setting of the parking position 76 (see FIG. 6) is received in step S27, the automatic parking control unit 55 detects feature points related to the designated parking position 76, from the recognition data on the outside acquired by the front camera 12Fr, the rear camera 12Rr, the left side camera 12L, and the right side camera 12R, and automatically parks the vehicle 10 at the parking position 76 based on the detected feature points (step S28). The automatic parking process is the same process as step S13 in FIG. 5 described above. For example, as illustrated in FIG. 7, the automatic parking control unit 55 detects the building feature points 77*a* to 77*d*, the obstacle feature points 78*a* to 78*f*, and the like related to the designated parking position 76.

Next, the automatic parking control unit 55 prompts the driver to newly register the map generated based on the feature points related to the designated parking position 76 detected in step S28 (step S29). For example, the automatic parking control unit 55 displays the bird's-eye view image as illustrated in FIG. 7 on the touch panel 42 and displays "Registering a parking location in a bright scene may increase the parking success rate. Would you like to register?", "Registering a parking location in a dark scene may increase the parking success rate. Would you like to register?", or the like. Here, a "registration button" to be touch-operated when registering and a "non-registration button" to be touch-operated when not registering may be displayed.

Next, the automatic parking control unit 55 determines whether the driver performed an operation to newly register a map (step S30).

When the operation to newly register a map is performed in step S30 (step S30: Yes), the automatic parking control unit 55 registers a map composed of feature points related to the designated parking position 76 detected in step S28 and the parking position manually set in step S27 in association with a slot corresponding to the illuminance calculated in step S21, in the storage unit 54 (step S31).

Thus, a slot corresponding to illuminance and a map illustrating feature points are additionally registered in the correspondence table 81 illustrated in FIG. 8 provided for the designated parking position of the No. 1-image button 62*a*.

When the operation to newly register a map is not performed in step S30 (step S30: No), the automatic parking control unit 55 ends the automatic parking control process without registering the map.

As described above, the automatic parking control unit 55 of the moving body control device performs automatic parking control for parking the vehicle 10 at a predetermined parking position based on the recognition data on the outside and the predetermined parking position, and registers the predetermined parking position as a designated parking position. Then, a map including feature points related to the designated parking position is registered by using a plurality of slot patterns based on the illuminance of the outside calculated from the recognition data on the outside. According to such configuration, since the feature points related to the designated parking position are registered in a plurality of slot patterns based on the illuminance of the outside, even when the illuminance of the outside of the vehicle 10 varies depending on the time zone (daytime, nighttime, or the like) and the weather (clear weather, cloudy weather, or the like), automatic parking control to the designated parking position can be executed.

The automatic parking control unit 55 selects a specific slot pattern corresponding to the illuminance acquired from the recognition data on the outside when executing the automatic parking control of the vehicle 10 to the designated parking position from among the plurality of slot patterns of the feature points, and performs automatic parking control of the vehicle 10 to the designated parking position based on the selected specific slot pattern. Thus, it is possible to select an appropriate slot pattern of feature points according to the illuminance of the outside of the vehicle 10, thereby improving the accuracy of the automatic parking control.

When self-position recognition by the vehicle 10 is not possible based on the specific slot pattern corresponding to the illuminance acquired from the recognition data on the outside when executing the automatic parking control to the designated parking position, the automatic parking control unit 55 does not perform automatic parking control to the designated parking position based on the corresponding specific slot pattern. As such, safety can be maintained by not performing automatic parking control when the self-position recognition by the vehicle 10 is not possible.

Although the embodiment of the present disclosure is described above, the present disclosure is not limited to the above embodiment, and can be modified, improved, and the like as appropriate.

For example, in the above-described embodiment, slots are classified into "daytime" and "nighttime" slots according to the illuminance of the outside, but the present invention is not limited thereto. For example, slots may be classified into slots such as "high" and "low" depending on the direct level of illuminance. Slots may be classified into three or more slots such as "high", "medium", and "bottom".

In the above-described embodiment, the case where the vehicle 10 is automatically parked by the automatic steering of the automatic parking control unit 55 was described, but the present disclosure is not limited thereto. For example, the present disclosure may be applied to parking support which assists in parking the vehicle 10 by a driver's operation.

In the above embodiment, the parking position of the vehicle 10, and feature points of the parking position and the surroundings are described using the bird's-eye view image (combined image) by the front camera 12Fr, the rear camera 12Rr, the left side camera 12L, and the right side camera 12R, but the present disclosure is not limited thereto. For example, an image captured by any one of the front camera 12Fr, the rear camera 12Rr, the left side camera 12L, and the right side camera 12R may be used for explanation.

In the above embodiment, the case where the automatic parking control unit 55 displays the bird's-eye view image 71 and the like on the touch panel 42 of the vehicle 10 was described, but the present disclosure is not limited thereto. For example, the automatic parking control unit 55 may display the bird's-eye view image 71 or the like on the display screen of an information terminal (such as a smart phone) possessed by the passenger of the vehicle 10 via the communication unit 24.

In the above embodiment, a case was described in which information such as a map including feature points related to a designated parking position and slots based on the illuminance of the outside is registered in the storage unit 54 of the vehicle 10, but the present disclosure is not limited thereto. For example, such information may be registered in a storage unit of another device such as a smart phone or a server which is communicably connected to the vehicle 10.

In the above embodiment, the case in which the user touch-operates the registered parking position image button 62 when parking the vehicle 10 at the registered parking position (selecting and touch-operating the No. 1-image button 62*a* in FIG. 4) was described, but the present disclosure is not limited thereto. For example, when the user touches the automatic parking button 60 displayed on the touch panel 42 to automatically park the vehicle 10, the automatic parking control unit 55 may compare the bird's-eye view image captured when automatic parking is executed with the registered bird's-eye view image to automatically determine a parking position in which the vehicle is to be parked now, and start the process of FIG. 10, for example. Thus, there is no need for the user of the vehicle 10 to find and select the button for the current parking position among the registered parking position image buttons 62.

In the above-described embodiment, an example in which a vehicle (a four-wheeled automobile) is used as the moving body was described, but the present disclosure is not limited thereto. For example, the moving body may be a vehicle such as a two-wheeled vehicle or a Segway. The concept of the present disclosure is not limited to vehicles, but can be applied to robots, ships, aircraft, or the like which are equipped with a driving source and can move by the power of the driving source.

The moving body control method described in the above embodiment can be implemented by executing a prepared moving body control program on a computer. The moving body control program is recorded in a computer-readable storage medium and executed by being read out from the storage medium. The moving body control program may be provided in a form stored in a non-transitory storage medium such as a flash memory, or may be provided via a network such as the Internet. The computer which executes the moving body control program may be included in the moving body control device, or may be included in an electronic device such as a smart phone, tablet terminal, or personal computer which can communicate with the moving body control device, or may be included in a server device which can communicate with the moving body control device and the electronic device.

At least the following matters are described in the specification. Although corresponding components are described in the parenthesis in the above-described embodiment, the present invention is not limited thereto.

(1) A Moving Body Control Device Including:

an outside recognition unit (the front camera 12Fr, the rear camera 12Rr, the left side camera 12L, and the right side camera 12R) configured to acquire recognition data of an outside of a moving body (vehicle 10);

a reception unit (touch panel 42) which receives designation of a predetermined parking position from a user of the moving body; and a control unit (an automatic parking control unit 55) configured to perform automatic parking control for parking the moving body at the predetermined parking position based on the recognition data of the outside and the predetermined parking position, and registers the predetermined parking position as a designated parking position, in which the control unit is configured to register feature points related to the designated parking position by using a plurality of patterns based on illuminance of the outside calculated from the recognition data of the outside.

According to (1), since the feature points related to the designated parking position are registered in a plurality of patterns based on the illuminance of the outside, even when the illuminance of the outside of the moving body varies depending on the time zone (daytime, nighttime, or the like) and the weather (clear weather, cloudy weather, or the like), automatic parking control to the designated parking position can be executed.

(2) The moving body control device according to (1), in which the control unit is configured to select a specific pattern corresponding to the illuminance acquired from the recognition data of the outside when executing the automatic parking control to the designated parking position, among the plurality of patterns of the feature points, and perform the automatic parking control to the designated parking position, based on the specific pattern.

According to (2), it is possible to select an appropriate feature point pattern according to the illuminance of the environment of the outside of the moving body, and improve the accuracy of automatic parking control.

(3) The moving body control device according to (2), in which the control unit is configured not to perform the automatic parking control to the designated parking position based on the specific pattern, when self-position recognition by the moving body is not possible based on the specific pattern.

According to (3), safety can be improved by not performing automatic parking control when the self-position recognition by the moving body is not possible.

(4) A moving body control method including a processor of a moving body control device, in which the processor of moving body control device is configured to:

acquire recognition data of an outside of a moving body;

receive designation of a predetermined parking position from a user of the moving body;

perform automatic parking control for parking the moving body at the predetermined parking position based on the recognition data of the outside and the predetermined parking position, and register the predetermined parking position as a designated parking position; and register feature points related to the designated parking position by using a plurality of patterns based on illuminance of the outside calculated from the recognition data of the outside.

According to (4), since the feature points related to the designated parking position are registered in a plurality of patterns based on the illuminance of the outside, even when the illuminance of the outside of the moving body varies depending on the time zone (daytime, nighttime, or the like) and the weather (clear weather, cloudy weather, or the like), automatic parking control to the designated parking position can be executed.

(5) A moving body control program causing a processor of a moving body control device to execute a process of:

acquiring recognition data on an outside of a moving body;

receiving designation of a predetermined parking position from a user of the moving body;

performing automatic parking control for parking the moving body at the predetermined parking position based on the recognition data of the outside and the predetermined parking position, and registering the predetermined parking position as a designated parking position; and registering feature points related to the designated parking position by using a plurality of patterns based on illuminance of the outside calculated from the recognition data of the outside.

According to (5), since the feature points related to the designated parking position are registered in a plurality of patterns based on the illuminance of the outside, even when the illuminance of the outside of the moving body varies depending on the time zone (daytime, nighttime, or the like) and the weather (clear weather, cloudy weather, or the like), automatic parking control to the designated parking position can be executed.

What is claimed is:

1. A moving body control device comprising:

an outside recognition unit configured to acquire recognition data of an outside of a moving body;

a reception unit which receives designation of a predetermined parking position from a user of the moving body; and a control unit configured to perform automatic parking control for parking the moving body at the predetermined parking position based on the recognition data of the outside and the predetermined parking position, and register the predetermined parking position as a designated parking position after parking the moving body at the predetermined parking position, wherein the control unit is configured to detect feature points around the designated parking position, and register, with respect to the designated parking position, a plurality of patterns of the feature points based on illuminance of the outside calculated from the recognition data of the outside, and the control unit is configured to select a specific pattern corresponding to the illuminance around the moving body acquired from the recognition data of the outside when executing the automatic parking control to the designated parking position, among the plurality of patterns of the feature points, and perform the automatic parking control to the designated parking position based on the specific pattern.

2. The moving body control device according to claim 1, wherein the control unit is configured not to perform the automatic parking control to the designated parking position based on the specific pattern, when self-position recognition by the moving body is not possible based on the specific pattern.

3. A moving body control method including a processor of a moving body control device, wherein the processor of the moving body control device is configured to:

acquire recognition data of an outside of a moving body;

receive designation of a predetermined parking position from a user of the moving body;

perform automatic parking control for parking the moving body at the predetermined parking position based on the recognition data of the outside and the predetermined parking position, and register the predetermined parking position as a designated parking position after parking the moving body at the predetermined parking position;

detect feature points around the designated parking position, and register, with respect to the designated parking position, a plurality of patterns of the feature points based on illuminance of the outside calculated from the recognition data of the outside; and select a specific pattern corresponding to the illuminance around the moving body acquired from the recognition data of the outside when executing the automatic parking control to the designated parking position, among the plurality of patterns of the feature points, and perform the automatic parking control to the designated parking position based on the specific pattern.

4. A non-transitory computer-readable storage medium storing a moving body control program causing a processor of a moving body control device to execute a process of:

acquiring recognition data on an outside of a moving body;

receiving designation of a predetermined parking position from a user of the moving body;

performing automatic parking control for parking the moving body at the predetermined parking position based on the recognition data of the outside and the predetermined parking position, and registering the predetermined parking position as a designated parking position after parking the moving body at the predetermined parking position;

detecting feature points around the designated parking position, and registering, with respect to the designated parking position, a plurality of patterns of the feature points based on illuminance of the outside calculated from the recognition data of the outside; and selecting a specific pattern corresponding to the illuminance around the moving body acquired from the recognition data of the outside when executing the automatic parking control to the designated parking position, among the plurality of patterns of the feature points, and performing the automatic parking control to the designated parking position based on the specific pattern.

5. The moving body control device according to claim 1, wherein the control unit is configured to perform the automatic parking control to the designated parking position based on a pattern other than the specific pattern among the plurality of patterns of the feature points, in a case where the specific pattern corresponding to the illuminance acquired from the recognition data of the outside when performing the automatic parking control to the designated parking position that has been registered does not exist.

* * * * *